United States Patent
Hakeem et al.

(10) Patent No.: US 9,764,988 B1
(45) Date of Patent: Sep. 19, 2017

(54) SIALON CERAMICS AND A METHOD OF PREPARATION THEREOF

(71) Applicant: KING FAHD UNIVERSITY OF PETROLEUM AND MINERALS, Dhahran (SA)

(72) Inventors: Abbas Saeed Hakeem, Dhahran (SA); Tahar Laoui, Dhahran (SA); Moath Mohammad Almaliki, Dhahran (SA); Awais Muhammad Raja Khan, Dhahran (SA); Faheemuddin Patel, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/074,646

(22) Filed: Mar. 18, 2016

(51) Int. Cl.
*C04B 35/597* (2006.01)
*C04B 35/64* (2006.01)

(52) U.S. Cl.
CPC ............ *C04B 35/597* (2013.01); *C04B 35/64* (2013.01); *C04B 2235/3208* (2013.01); *C04B 2235/3869* (2013.01); *C04B 2235/666* (2013.01)

(58) Field of Classification Search
CPC .................................................. C04B 35/597
See application file for complete search history.

(56) References Cited

U.S. PATENT DOCUMENTS

| | | | | |
|---|---|---|---|---|
| 4,547,470 A | * | 10/1985 | Tanase | C04B 35/597 264/122 |
| 5,158,916 A | | 10/1992 | Claussen | |
| 5,227,346 A | * | 7/1993 | Hwang | C04B 35/597 501/98.2 |
| 5,370,832 A | * | 12/1994 | Sugimoto | H01T 13/38 264/619 |
| 6,776,927 B2 | * | 8/2004 | Mitomo | C04B 35/597 250/484.4 |
| 6,824,727 B2 | | 11/2004 | Roy et al. | |
| 7,223,709 B2 | | 5/2007 | Yeckley | |

FOREIGN PATENT DOCUMENTS

CN 1923754 * 3/2007
WO WO 2010/022789 A1 3/2010

OTHER PUBLICATIONS

X. Yi, et al., "Preparation of β-Si6-zAlzOzN8-z (z = 1-3) by combustion synthesis" IOP Conf. Series: Materials Science and Engineering 18, (2001), pp. 1-4.
L. Liu, et al., "Synthesis of α-SiC/α-SiAlON composites by spark plasma sintering: Phase formation and microstructures development" Journal of the European Ceramic Society 31, Jun. 2011, pp. 2129-2135.

* cited by examiner

*Primary Examiner* — Karl Group
(74) *Attorney, Agent, or Firm* — Oblon, McClelland, Maier & Neustadt, L.L.P.

(57) ABSTRACT

A Ca—SiAlON ceramic with enhanced mechanical properties and a method employing micron-sized and submicron precursors to form the Ca—SiAlON ceramic. The Ca—SiAlON ceramic comprises not more than 42 wt % silicon, relative to the total weight of the Ca—SiAlON ceramic. The method employs submicron particles and also allows for substituting a portion of aluminum nitride with aluminum to form the Ca—SiAlON ceramic with enhanced mechanical properties.

18 Claims, 23 Drawing Sheets

SIALON CERAMICS AND A METHOD OF PREPARATION THEREOF

STATEMENT OF ACKNOWLEDGEMENT

The authors wish to acknowledge King Abdul-Aziz City for Science and Technology (KACST) represented by the science and technology unit in King Fand University for Petroleum and Minerals (KFUPM) for funding this work through the National Science, Technology and Innovation Plan (NSTIP) with a project no. 12-ADV2411-04.

BACKGROUND

Field of the Disclosure

The present disclosure relates to SiAlON ceramics with enhanced mechanical properties and a method of making these SiAlON ceramics.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Silicon nitride ($Si_3N_4$) ceramics have been shown to withstand severe working conditions due to their remarkable mechanical and thermal properties, namely hot hardness, chemical inertness and thermal shock resistance (Riley, Frank L. Journal of the American Ceramic Society 83.2 (2000): 245-265, incorporated herein by reference in its entirety). However, full densification of $Si_3N_4$ powder under the pressure and temperature provided by conventional solid-state sintering techniques has been challenging. The difficulty is attributed to the strong covalent Si—N bond, which resists plastic deformation (Liu, Limeng, et al. Journal of the European Ceramic Society 30.12 (2010): 2683-2689; Belmonte, M., et al. Journal of the European Ceramic Society 30.14 (2010): 2937-2946, each incorporated herein by reference in their entirety). Therefore, Jack and Oyama have developed SiAlON ceramics that are solid solutions of alumina oxide ($Al_2O_3$) in $Si_3N_4$, in which a portion of silicon and nitrogen is replaced by aluminum and oxygen, respectively (Jack, K. H., and W. I. Wilson. Nature Physical Science (1972): 28-29; Oyama, Yoichi, and Osami Kamigaito. Japanese Journal of Applied Physics 10.11 (1971): 1637, Jack, K. H. Journal of materials science 11.6 (1976): 1135-1158, each incorporated herein by reference in their entirety).

To prepare a fully dense ceramic, $Al_2O_3$ is mixed with $Si_3N_4$ in the sintering process to form a pure SiAlON ceramic (Cao, G. Z., and Ruud Metselaar. Chemistry of Materials 3.2 (1991): 242-252, incorporated herein by reference in their entirety). Based on the composition of the initial powder mixture and the sintering parameters, several phases, including α-SiAlON, β-SiAlON, O—SiAlON, X—SiAlON or a mixture of them, can form and exist in the SiAlON ceramic (Zhou, Y., et al. Journal of Materials science 30.18 (1995): 4584-4590; Vleugels, Jozef, et al. Institute of physics conference series. No. 130. 1993; Laoui, Tahar, and Omer Van der Biest. Key Engineering Materials. Vol. 89. 1993, each incorporated herein by reference in their entirety). In particular, α-SiAlON and β-SiAlON have attracted attention in the past two decades due to their favorable mechanical properties: high hardness for α-SiAlON and reasonable fracture toughness for β-SiAlON (Izhevskiy, V. A., et al. Journal of the European Ceramic Society 20.13 (2000): 2275-2295; Ekström, Thommy, and Mats Nygren. Journal of the American Ceramic Society 75.2 (1992): 259-276, each incorporated herein by reference in their entirety).

Later, researchers explored other sintering aids to improve the ceramic densification at a lower energy input (i.e. lower sintering temperature and a shorter sintering time) and to produce ceramics with optimal mechanical and optical properties. Lanthanides, such as Nd, La and Yb, have been studied (Herrmann, Mathias, Sören Höhn, and Axel Bales. Journal of the European Ceramic Society 32.7 (2012): 1313-1319; Menke, Yvonne, Valerie Peltier-Baron, and Stuart Hampshire. Journal of non-crystalline solids 276.1 (2000): 145-150; Bandyopadhyay, Siddhartha, M. J. Hoffmann, and G. Petzow. Ceramics international 25.3 (1999): 207-213; Hakeem, Abbas Saeed, Jekabs Grins, and Saeid Esmaeilzadeh. Journal of the European Ceramic Society 27.16 (2007): 4773-4781, each incorporated herein by reference in their entirety). However, the lanthanides have large ionic radii and they poorly occupy the interstitial sites of $Si_3N_4$, producing ceramics with crystal defects. In addition, introducing lanthanides into ceramics is also cost-prohibitive.

In view of the foregoing, the objective of the present disclosure is to provide SiAlON ceramics with enhanced mechanical properties and a method of producing these SiAlON ceramics.

SUMMARY OF THE DISCLOSURE

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

A first aspect of the disclosure relates to a process for producing a Ca—SiAlON ceramic, comprising: (i) mixing (a) calcium oxide, (b) silicon nitride, (c) alumina, (d) aluminum nitride, and (e) aluminum to form a powder mixture, (ii) sintering the powder mixture to form the Ca—SiAlON ceramic, and (iii) cooling the Ca—SiAlON ceramic to a temperature ranging from 20-40° C.

In one embodiment, the sintering is performed in an atmosphere consisting essentially of nitrogen gas.

In one embodiment, the mixing is at least one of sonication and ball milling.

In one embodiment, the mixing proceeds for 10-30 minutes.

In one embodiment, the calcium oxide is in the form of particles with a diameter ranging from 1-200 nm.

In one embodiment, an amount of the silicon nitride ranges from 40 wt % to less than 80 wt % relative to a total weight of the powder mixture.

In one embodiment, the silicon nitride is α-$Si_3N_4$ and in the form of particles with a diameter ranging from 1-200 nm.

In one embodiment, the silicon nitride is amorphous and in the form of particles with a diameter ranging from 1-100 nm.

In one embodiment, the alumina is in the form of particles with a diameter ranging from 1-200 nm.

In one embodiment, the aluminum nitride is in the form of particles with a diameter ranging from 1-200 nm.

In one embodiment, the aluminum is in the form of particles with a diameter ranging from 10-100 μm.

In one embodiment, an amount of the aluminum ranges from more than 0 wt % to 10 wt % relative to a total weight of the powder mixture.

In one embodiment, the sintering is a spark plasma sintering process.

In one embodiment, the sintering is performed at a temperature ranging from 1400-1600° C.

In one embodiment, the sintering comprises heating the powder mixture at a rate ranging from 5-600° C./min.

In another embodiment, the rate ranges from 90-110° C./min.

In one embodiment, the sintering comprises applying a uniaxial pressure ranging from 20-150 MPa to the powder mixture.

In another embodiment, the uniaxial pressure ranges from 45-55 MPa.

A second aspect of the disclosure relates to a Ca—SiAlON ceramic, comprising: (i) calcium, (ii) silicon in an amount less than 42 wt % of a total weight of the Ca—SiAlON ceramic, (iii) aluminum, (iv) oxygen, and (v) nitrogen, where the Ca—SiAlON ceramic comprises at least one of the following phases: a β-SiAlON phase, an α-SiAlON phase, silicon dioxide, a $SiAl_yO_2N_y$ phase, wherein y ranges from 4 to 6.

DETAILED DESCRIPTION OF THE DISCLOSURE

Figure 1A:
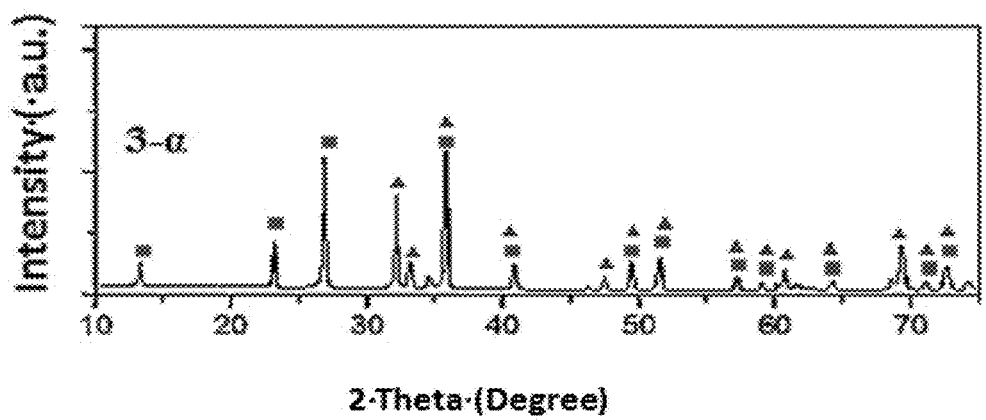
FIG. 1A shows the XRD pattern of sample 3-α (sintered at 1600° C.), which comprises β-SiAlON (■) and $Si_{3.1}Al_{2.9}O_{2.9}N_{5.1}$ (▲).
Figure 1B:
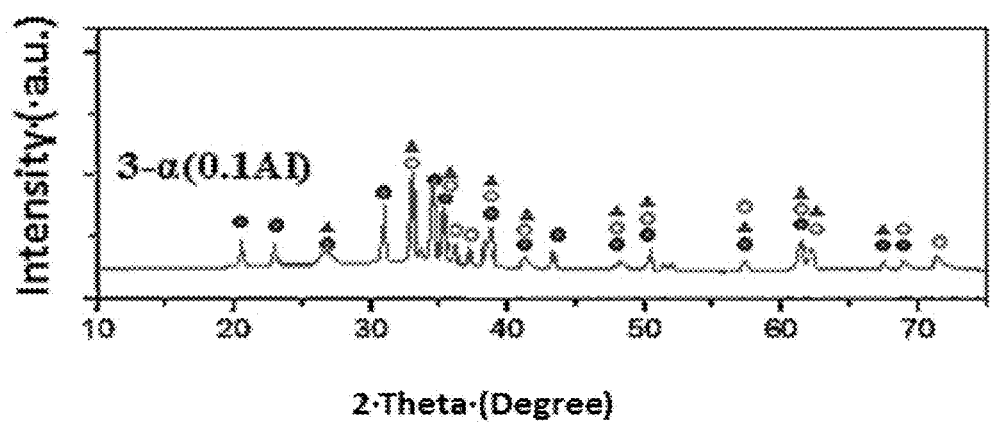
FIG. 1B shows the XRD pattern of sample 3-α (0.1Al) (with 10 mol % of aluminum nitride substituted with aluminum and sintered at 1600° C.), which comprises α-SiAlON (●), $Si_{3.1}Al_{2.9}O_{2.9}N_{5.1}$ (▲) and $SiAl_5O_2N_5$ (○).
Figure 1C:
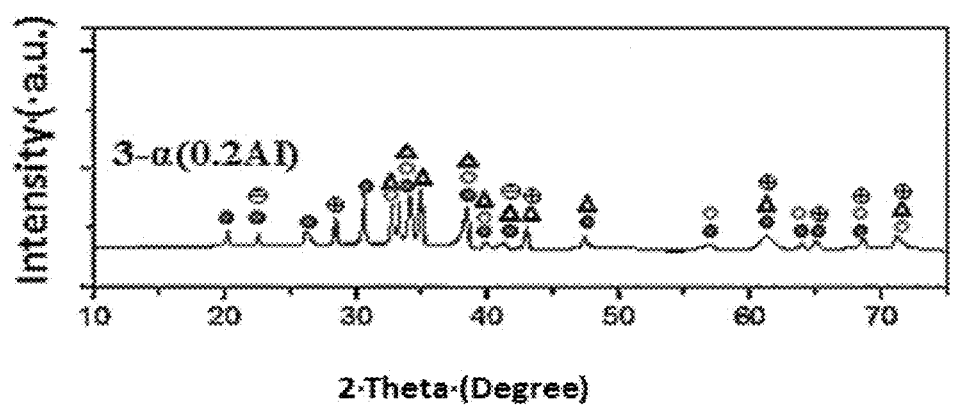
FIG. 1C shows the XRD pattern of sample 3-α-(0.2Al) (with 20 mol % of aluminum nitride substituted with aluminum and sintered at 1600° C.), which comprises α-SiAlON (●), $SiAl_2O_2N_5$ (○), $SiAl_6O_2N_6$ (Δ) and $SiO_2$ (⊕).

Embodiments of the present disclosure will now be described more fully hereinafter with reference to the accompanying drawings, in which some, but not all embodiments of the disclosure are shown.

Within the description of this disclosure, where a numerical limit or range is stated, the endpoints are included unless stated otherwise. Also, all values and subranges within a numerical limit or range are specifically included as if explicitly written out. As used herein, the words "a" and "an" and the like carry the meaning of "one or more".

Improving ceramic densification at a lower energy input (i.e. lower sintering temperature and a shorter sintering time) to produce ceramics with favorable mechanical properties has been a challenge for the research community. One approach is to employ sintering aids such as lanthanides, alkaline earth metals and/or oxides of alkaline earth metals. Among these candidates, calcium oxide seems the most promising because the calcium atom can reside in α-SiAlON structure without distorting the crystal structure (Wang, P. L., et al. Materials Letters 38.3 (1999): 178-185; Wang, P. L., Y. W. Li, and D. S. Yan. Journal of the European Ceramic Society 20.9 (2000): 1333-1337, each incorporated herein by reference in their entirety). In addition, calcium compounds are more economical than lanthanide compounds (Van Rutten, J. W. T., H. T. Hintzen, and Ruud Metselaar. Ceramics international 27.4 (2001): 461-466, incorporated herein by reference in its entirety). Another approach to achieve ceramic densification at a lower sintering temperature is to employ submicron-sized and/or nano-sized starting powders, as described hereinafter.

Therefore, the first aspect of this disclosure relates to a process for producing a Ca—SiAlON ceramic, the process comprising: (i) mixing (a) calcium oxide, (b) silicon nitride, (c) alumina, (d) aluminum nitride, and (e) aluminum to form a powder mixture, (ii) sintering the powder mixture to form the Ca—SiAlON ceramic, and (iii) rapidly cooling the Ca—SiAlON ceramic to about 20-40° C., where at least one of the aforementioned components are submicron-sized or nano-sized. In one embodiment, the process is performed in an atmosphere consisting essentially of nitrogen gas. In a preferred embodiment, the atmosphere is nitrogen gas with a purity of more than 99.99%.

The aforementioned components may be clusters, aggregates, powders or particles. In a preferred embodiment, the components are particles. The aforementioned components may be mixed by sonication and/or ball milling. In a preferred embodiment, the powders are dispersed in a sufficient amount of an organic solvent, preferably volatile at room temperature, to form a slurry and sonicated for 10-30 minutes, preferably 15-25 minutes, with an ultrasonic probe. Non-limiting examples of the organic solvent include hydrocarbons, such as hexane, alcohols, such as ethanol, methanol, propanol, isopropanol, butanol, ketones and esters. Preferably, the solvent is an alcohol. More preferably, the alcohol has a melting point lower than 0° C. and a boiling point lower than 100° C. In a preferred embodiment, the alcohol is ethanol. The organic solvent may act as a viscosity modifying agent, providing a suitable viscosity for handling the slurry and accomplishing the mixing. In addition, the solvent may have a viscosity ranging from 0.5-2 cP, preferably 0.5-1.5 cP, more preferably 0.5-1.2 cP. Any amount of liquid that accomplishes the mixing is acceptable. Preferably, the solids content is between 15-50 vol %, preferably 15-35 vol %, more preferably 20-30 vol % of the total volume of the slurry. Below this limit mixing may be ineffective or separation by settling may occur, although a solid content below this limit may still be used depending on the particle size, solvent, and mixing procedure. Above the limit, in some instances, the viscosity may be too high and mixing and de-agglomeration may not be effective. The volatile organic solvent may evaporate during sonication, leaving no residue. Preferably, the slurry is heated to 75-85° C. for 2-24 hours, preferably 10-24 hours, more preferably 16-24 hours to remove the solvent completely.

In one embodiment, the powders are milled with a miller, such as a planetary miller, an attrition mill, a vibratory mill or a high energy miller. Non-limiting examples of milling media (i.e. bowl and balls) include tungsten carbide, silicon nitride and alumina. Preferably, silicon nitride milling media is employed to minimize contamination of the powder mixture. In one embodiment, a weight ratio of the balls to the powder mixture ranges from 5:1 to 20:1, preferably from 5:1 to 10:1, more preferably from 7:1 to 10:1. A process control agent, such as stearic acid, may be added to the powder mixture to ensure the powder mixture does not cake. An amount of the process control agent ranges from more than 0 wt % to 2 wt %, preferably 0.5-1.5 wt %, more preferably 0.5-1 wt % of the weight of the powder mixture.

In a preferred embodiment, no process control agent is employed. In one embodiment, the milling is performed in an inert atmosphere, preferably provided by argon gas. The powder mixture may be milled for up to 10 hours, or up to 5 hours, or up to 1 hour, preferably for 10-30 minutes, preferably for 15-25 minutes.

The calcium oxide particles, silicon nitride particles, alumina particles, aluminum nitride particles and aluminum particles may be spheres, spheroids, ellipsoids, flakes or irregular shapes, unless otherwise specified. In a preferred embodiment, the particles are spheres or substantially spherical. A diameter of the particle, as used herein, refers to the greatest possible distance measured from one point on the particle through the center of the particle to a point directly across from it. A diameter of a flake, as used herein, refers to the greatest possible distance measured from a first point on a perimeter of the flake through the center of the flake to a second point, also on the perimeter of the flake, directly across from the first point. The diameters of the particles are described hereinafter.

The calcium oxide particles have a diameter ranging from 1-200 nm, preferably 10-180 nm, more preferably 80-160 nm. A purity of calcium oxide particles is more than 95 wt %, preferably more than 97 wt %, and more preferably more than 98 wt % relative to the total weight of the calcium oxide particles. An amount of the calcium oxide particles in the powder mixture ranges from more than 0 wt % to 20 wt %, preferably 3-10 wt %, more preferably 8-10 wt % of the total weight of the powder mixture.

An amount of the silicon nitride particles in the powder mixture ranges from 40 wt % to less than 80 wt %, preferably 40-60 wt %, more preferably 40-50 wt % relative to the total weight of the powder mixture. A purity of silicon nitride particles is more than 98 wt %, preferably more than 99 wt %, and more preferably more than 99.9 wt % relative to the total weight of the silicon nitride particles. The silicon nitride particles may be $\alpha$-$Si_3N_4$, $\beta$-$Si_3N_4$, $\gamma$-$Si_3N_4$ and amorphous $Si_3N_4$ and mixtures thereof. In a preferred embodiment, the silicon nitride particles are $\alpha$-$Si_3N_4$ and have a diameter ranging from 1-200 nm, preferably 10-180 nm, more preferably 80-150 nm. In another embodiment, the silicon nitride particles are amorphous and have a diameter ranging from 1-100 nm, preferably 10-50 nm, more preferably 10-30 nm.

The alumina particles have a diameter ranging from 1-200 nm, preferably 10-180 nm, more preferably 80-150 nm. The alumina may be $\alpha$-alumina, $\gamma$-alumina, $\eta$-alumina, $\theta$-alumina, $\delta$-alumina, $\chi$-alumina and $\kappa$-alumina. In a preferred embodiment, $\alpha$-alumina is employed. A purity of the alumina particles is at least 99 wt %, preferably at least 99.5 wt %, more preferably at least 99.8 wt % relative to the total weight of the alumina particles. An amount of the alumina particles in the powder mixture ranges from more than 0 wt % to 20 wt %, preferably 5-18 wt %, more preferably 15-18 wt % of the total weight of the powder mixture.

The aluminum nitride particles have a diameter ranging from 1-200 nm, preferably 10-180 nm, more preferably 80-150 nm. A purity of aluminum nitride particles is more than 98 wt %, preferably more than 99 wt %, and more preferably more than 99.9 wt % relative to the total weight of the aluminum nitride particles. An amount of the aluminum nitride particles in the powder mixture ranges from more than 0 wt % to 30 wt %, preferably 10-30 wt %, more preferably 20-30 wt % of the total weight of the powder mixture.

Adding aluminum metal to the powder mixture may increase the amount of a liquid phase in the ceramic during sintering and thus may lead to ceramic densification and a ceramic with enhanced mechanical properties. A portion of aluminum nitride particles may be replaced by aluminum particles, and this portion ranges from 5-50 mol %, preferably 5-40 mol %, more preferably 10-30 mol % of the original amount of aluminum nitride particles in a ceramic sample prepared without aluminum particles. The lesser amount of nitrogen when aluminum particles are employed may be compensated by sintering the powder mixture in the presence of nitrogen gas, which reacts with aluminum particles to form aluminum nitride under the sintering conditions.

An amount of aluminum particles, expressed in wt % of the total weight of the powder mixture, ranges from more than 0 wt % to 10 wt %, preferably 0.8-8 wt %, more preferably 1-6 wt %. The aluminum particles have a diameter ranging from 10-100 µm, preferably 30-70 µm, more preferably 40-50 µm. A purity of aluminum particles is more than 95 wt %, preferably more than 99 wt %, more preferably more than 99.95 wt % relative to the total weight of the aluminum particles.

The sintering process may be hot pressing, hot isostatic pressure, pressureless sintering or spark plasma sintering. Preferably, the sintering is a spark plasma sintering process because this process densifies the compacted powders faster than the aforementioned processes and at relatively low temperatures (Salamon, David, Zhijian Shen, and Pavol Šajgalík. Journal of the European Ceramic Society 27.6 (2007): 2541-2547, incorporated herein by reference in its entirety). Thus, the formation of unfavorable secondary phases with poorer mechanical properties may be minimized. A ratio of the weight of the secondary phases relative to the weight of the primary phases (e.g. a β-SiAlON phase, an α-SiAlON phase, silicon dioxide and a $SiAl_yO_2N_y$ phase) may range from 1:199 to 5:95, preferably 1:199 to 5:145, more preferably 1:199 to 1:99. The ratio may be estimated by comparing the peak area ratio of the XRD patterns.

The powder mixture may be poured into a graphite die with a diameter of 10-50 mm, preferably 15-35 mm, more preferably 15-25 mm. The powder mixture may be compacted at ambient temperature. In a preferred embodiment, a uniaxial pressure is applied to the die in a direction that is normal to the ground. The pressure ranges from 20-150 MPa, preferably 20-100 MPa, more preferably 45-55 MPa. The sintering involves heating the powder mixture at a rate ranging from 5-600° C./min, preferably 50-200° C./min, more preferably 90-110° C./min. The heating may comprise of at least one heating step. In a preferred embodiment, the heating consists of only one heating step. The sintering is performed at a temperature ranging from 1400-1900° C., preferably 1400-1700° C., more preferably 1400-1600° C. The Ca—SiAlON ceramic starts to cool down once the current is switched off. The cooling of the Ca—SiAlON ceramic may be controlled and/or accelerated with a pre-set program. In a preferred embodiment, the ceramic is cooled down at a rate ranging from 1-200° C./s, preferably 1-100° C./s, more preferably 5-100° C./s by a flow of nitrogen gas. The ceramic may be cooled to a temperature ranging from 20-40° C., preferably 20-30° C., more preferably 20-25° C.

The second aspect of this disclosure relates to a Ca—SiAlON ceramic, comprising: (i) calcium, (ii) silicon, (iii) aluminum, (iv) oxygen, and (v) nitrogen, where the Ca—SiAlON ceramic comprises at least of the following phases: a β-SiAlON phase, an α-SiAlON phase, silicon dioxide, a $SiAl_yO_2N_y$ phase, wherein y ranges from 4-6, preferably 5-6, more preferably about 6. In one embodiment, y is a whole number and not an integer. In a preferred embodiment, y is an integer. A N:O ratio of the aluminum silicon oxynitride phases (e.g. the β-SiAlON phase and the $SiAl_yO_2N_y$ phase) ranges from 5:3 to 3:1, preferably 5:2 to 3:1, more preferably about 3:1. The presence of these crystalline phases may be measured by methods such as XRD analysis. In one embodiment, the Ca—SiAlON ceramic consists of: (i) calcium, (ii) silicon, (iii) aluminum, (iv) oxygen, and (v) nitrogen.

The α-SiAlON phase may be of the formula $M_xSi_{12-(m+n)}Al_{m+n}O_nN_{16-n}$, where M represents a lanthanide metal cation, such as cerium, gadolinium and promethium, etc. and/or an alkaline earth metal cation, such as calcium, barium and magnesium, x is a whole number which ranges from more than 0 to 2, m is a whole number which ranges between 0.9-3.5, n is a whole number which ranges from more than 0 to 2. In a preferred embodiment, calcium atoms are present in the α-SiAlON phase (i.e. M is Ca) and the ceramic may be of the formula $CaSi_6Al_6O_4N_{12}$ (x=1, m=2, n=4).

The β-SiAlON phase is of the formula $Si_{6-z}Al_zO_zN_{8-z}$ where z ranges from more than 0 to less than 4.2 (Jack, K. H. Journal of Materials Science 11 (1976):1135-1158, incorporated herein by reference in its entirety). In a preferred embodiment, z ranges from 1-4, more preferably 2-4.

Weight percentages (relative to the total weight of the Ca—SiAlON ceramic) of the calcium, silicon, aluminum, oxygen and nitrogen in the Ca—SiAlON ceramic are described hereinafter. An amount of calcium ranges from more than 0 wt % to 7.5 wt %, preferably 2-7.5 wt %, more preferably 5-7.5 wt %. The amount of silicon is less than 42 wt %, preferably ranges from 24 wt % to less than 42 wt %, more preferably 24-36 wt %, and even more preferably 24-30 wt %. An amount of aluminum is at most 30.4 wt %, preferably ranges from 9.2-29.4 wt %, more preferably 21.2-29.4 wt %. An amount of oxygen is at most 12.5 wt %, preferably 3-11.5 wt %, more preferably 9-11.5 wt %. An amount of nitrogen ranges from 16-38.2 wt %, preferably 19.4-34.2 wt %, preferably 22.8-30.2 wt %. The aforementioned weight percentages of calcium, silicon, aluminum, oxygen and nitrogen may be measured by atomic absorption spectroscopy, the energy dispersive X-ray technique, the carrier-gas-heat-extraction method and a combination thereof (Beck, H. P. et al. Fresenius' Journal of Analytical Chemistry, 357.6 (1999):652-655, incorporated herein by reference in its entirety).

The grain size and morphology of the Ca—SiAlON ceramic are studied with electron microscopy, preferably scanning electron microscopy (SEM). The Ca—SiAlON ceramic has micropores and submicron pores. The size of the micropores ranges from 1-5 µm, preferably 1-4 µm, more preferably 1-3 µm. The size of the submicron pores ranges from 50-400 nm, preferably 100-300 nm, more preferably 100-250 nm. The porosity of the Ca—SiAlON ceramic is at most 20%, preferably at most 15%, preferably at most 5%, and more preferably at most 1%.

The grains of the Ca—SiAlON ceramic may be elongated, equiaxed, needles and/or flakes. The elongated grains may have a height ranging from 1-20 µm, preferably 1-15 µm, more preferably 1-10 µm, and a width ranging from 0.1-4 µm, preferably 0.5-3 µm, more preferably 0.5-2 µm. The aspect ratio of the elongated grains ranges from 2-200, preferably 10-150, more preferably 10-100. The elongated grains may be β-SiAlON grains. The equiaxed grains have a diameter ranging from 100-1,000 nm, preferably 200-900 nm, more preferably 300-500 nm. The equiaxed grains may be α-SiAlON grains. The needle-like grains have a length ranging from 1-20 µm, preferably 1-15 µm, more preferably 1-10 µm. The flake-like grains have a diameter of 1-15 µm, preferably 5-15 μm, more preferably 7-10 μm. The needle-like and flake-like grains may be β-SiAlON grains.

The properties of the SiAlON material are readily measured by standard tests. In particular, for the purposes of this disclosure, the fracture toughness of the ceramic is evaluated by the indentation technique, and the hardness with the Vickers hardness method (10 kg load) employing a universal hardness tester.

Substituting a portion of aluminum nitride particles with aluminum has led to the formation Ca—SiAlON ceramics with enhanced mechanical properties. In most embodiments, the Ca—SiAlON ceramic has a Vickers hardness ranging from 11.5-24.9 GPa, preferably 13.1-19.9 GPa, more preferably 15.5-19.9 GPa and a fracture toughness ranging from 3.9-11.4 MPa√m, preferably 5.7-11.4 MPa√m, more preferably 7-11.4 MPa√m. In one embodiment, where 15-35 mol % of aluminum nitride is substituted by aluminum and the powder mixture is sintered at 1600° C., the Vickers hardness of the ceramic ranges from 15.5-24.9 GPa and the fracture toughness ranges from 7.6-11.4 MPa√m. In one embodiment, where about 20 mol % of aluminum nitride is substituted by aluminum and the powder mixture is sintered at about 1600° C., the Vickers hardness of the ceramic is about 16 GPa and a fracture toughness of about 9.5 MPa√m. In another embodiment, where about 30 mol % of aluminum nitride is substituted by aluminum and the powder mixture is sintered at about 1600° C., the Vickers hardness of the ceramic is about 18.5 GPa and a fracture toughness of about 8.3 MPa√m.

In another embodiment, where 5-35 mol % of aluminum nitride is substituted with aluminum and the powder mixture is sintered at 1450° C., the Vickers hardness of the ceramic ranges from 18.2-19.9 GPa and the fracture toughness ranges from 5.7-8.6 MPa√m. In one embodiment, where about 10 mol % of aluminum nitride is substituted with aluminum and the powder mixture sintered at about 1450° C., the Vickers hardness of the ceramic is about 18.6 GPa and a fracture toughness of about 7.8 MPa√m. In another embodiment, where about 20 mol % of aluminum nitride is substituted with aluminum and the powder mixture sintered at about 1450° C., the Vickers hardness of the ceramic is about 19.1 GPa and a fracture toughness of about 6.4 MPa√m. In one embodiment, where about 30 mol % of aluminum nitride is substituted by aluminum and the powder mixture sintered at about 1450° C., the Vickers hardness is about 19.6 GPa and a fracture toughness of about 6.5 MPa√m.

The improvement in fracture toughness may be due to a crack deflection mechanism inherently supported by the mixed-morphology microstructure of the ceramic. The improvement in the Vickers hardness corresponded with an increase in a proportion of the α-SiAlON phase in the ceramic. In general, the α-SiAlON phase is harder than the β-SiAlON phase, which is more resistant to fracture. The reason behind this variation in the mechanical properties is explained through the consideration of the phase morphology, where the α-SiAlON grains are mostly equiaxed, while the β-SiAlON grains tend to be elongated.

The mechanical properties of the Ca—SiAlON ceramic may be altered by varying the weight ratio of the α-SiAlON and the β-SiAlON phases. As mentioned above, increasing the proportion of the α-SiAlON phase increases the hardness of the ceramic. In practice, varying the weight ratio may be accomplished by substituting a portion of aluminum nitride particles with aluminum particles. For instance, a portion of aluminum nitride particles may be replaced by aluminum particles, and this portion ranges from 5-50 mol %, preferably 5-40 mol %, more preferably 10-30 mol % of the original amount of aluminum nitride particles in a ceramic sample prepared without aluminum particles. The weight ratio of the α-SiAlON and the β-SiAlON phases may be measured by a peak area ratio of the XRD patterns, and the weight ratio ranges from 1:99 to 99:1. Preferably, the weight ratio is between about 50:50 and 99:1. More preferably, the weight ratio is between 80:20 and 99:1, and more preferably about 99:1.

Having generally described this disclosure, a further understanding can be obtained by reference to certain specific examples which are provided herein for purposes of illustration only and are not intended to be limiting unless otherwise specified.

Example 1 Experimental Procedure

The starting materials were α-silicon nitride (150 nm—SN-10, Japan), amorphous silicon nitride (20 nm—Chempur, Germany), alumina (150 nm—Chempur, Germany), aluminum nitride (100 nm—Sigma Aldrich, USA), calcium oxide (160 nm—Sigma Aldrich, USA) and aluminum metal (44 μm—Loba Chemie, India).

For illustration purposes, the chemical composition of the ceramic was fixed at $CaSi_6Al_6O_4N_{12}$, which corresponds to m=2 and n=4 in the general formula of α-SiAlON. The chemical reaction formula for a sample without aluminum replacement can be written as follows:

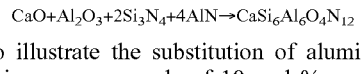

$$CaO+Al_2O_3+2Si_3N_4+4AlN \rightarrow CaSi_6Al_6O_4N_{12}$$

To illustrate the substitution of aluminum nitride with aluminum, an example of 10 mol % replacement is illustrated in the equation below. If 10 mol % of aluminum nitride is substituted with aluminum, the equation may be expressed as:

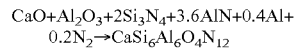

$$CaO+Al_2O_3+2Si_3N_4+3.6AlN+0.4Al+0.2N_2 \rightarrow CaSi_6Al_6O_4N_{12}$$

To calculate the amount of aluminum metal to add to the powder mixture, one should multiply each reactant by its molar weight, as shown in the first row in Table 1. To get the required mass of aluminum for a sample of 5 g, one should perform the following arithmetic operation (10.8/602.6)×5, which results in 0.0896 grams and corresponds to 1.8 wt % of the total weight of the powder mixture.

TABLE 1

Calculation example of 10% metallic aluminum replacement.

| Weight of powders (g) | | | | | | |
|---|---|---|---|---|---|---|
| CaO | $Al_2O_3$ | $Si_3N_4$ | AlN | Al | N | Total (g) |
| 56.1 | 102 | 280.6 | 147.6 | 10.8 | 5.6 | 602.6 |
| 0.4653 | 0.8461 | 2.3281 | 1.2244 | 0.0896 | 0.0465 | 5.0000 |

Table 2 lists the initial compositions for the powder mixtures with various amounts of aluminum.

TABLE 2

Weight percentages of the respective particles

| Sample | CaO | $Al_2O_3$ | $α-Si_3N_4$ | $Amp-Si_3N_4$ | AlN | Al | N |
|---|---|---|---|---|---|---|---|
| 3-α | 9.31 | 16.92 | 46.56 | — | 27.21 | — | — |
| 3-α(0.1Al) | 9.31 | 16.92 | 46.56 | — | 24.49 | 1.79 | 0.93 |
| 3-α(0.2Al) | 9.31 | 16.92 | 46.56 | — | 21.77 | 3.58 | 1.86 |

TABLE 2-continued

Weight percentages of the respective particles

| Sample | CaO | Al$_2$O$_3$ | α-Si$_3$N$_4$ | Amp-Si$_3$N$_4$ | AlN | Al | N |
|---|---|---|---|---|---|---|---|
| 3-α(0.3Al) | 9.31 | 16.92 | 46.56 | — | 19.05 | 5.37 | 2.79 |
| 3-Amp | 9.31 | 16.92 | — | 46.56 | 27.21 | — | — |
| 3-Amp(0.1Al) | 9.31 | 16.92 | — | 46.56 | 24.49 | 1.79 | 0.93 |
| 3-Amp(0.2Al) | 9.31 | 16.92 | — | 46.56 | 21.77 | 3.58 | 1.86 |
| 3-Amp(0.3Al) | 9.31 | 16.92 | — | 46.56 | 19.05 | 5.37 | 2.79 |

5 g samples were weighed and mixed in ethanol with an ultrasonic probe sonicator for 20 min. Samples were dried at 80° C. for 12 h to remove ethanol.

The powder mixtures were poured into 20 mm diameter graphite dies. Spark plasma sintering was performed at 1450° C. and 1600° C. for 30 min in the presence of nitrogen, with an uniaxial pressing at 16 KN, corresponding to a pressure of about 50 MPa. A heating rate of 100° C./min was adopted to avoid formation of intermediate phases. To freeze the formed structure, samples were then rapidly cooled down to room temperature.

For characterization, samples were mounted, ground and polished in accordance to the standard procedures. Rigaku MiniFlex X-ray diffractometer (Japan) was used to identify the phases present in the synthesized samples, in which $K_{Cu,\alpha 1}$=0.15416 nm, acceleration voltage=30 kV and tube current=10 mA. Samples were examined with a field emission scanning electron microscope (FESEM, Lyra 3, Tescan, Czech Republic) using both SE and BSE detectors, with an acceleration voltage of 20-30 kV to characterize their morphologies, and energy dispersive X-ray spectroscopy (EDX, Oxford Inc., UK) for elemental analysis of the present phases. Density was measured with the Archimedes method. Vickers hardness (10 Kg load) was evaluated using the universal hardness tester (Zwick-Roell, ZHU250, and Germany). Fracture toughness was calculated using the well-known indentation method, utilizing Evan's Formula, where MCL and d stand for maximum crack length and the impression diagonal, respectively (Hewett, C. L., Cheng, Y.-B., Muddle, B. C. and Trigg, M. B. J. Amer. Ceram. Soc. 81 (1998): 1781-1788, incorporated herein by reference in its entirety).

$$K_{IC} = 0.48\left(\frac{MCL}{d/2}\right)^{-1.5}\left(\frac{HV_{10}\sqrt{\frac{d}{2}}}{3}\right)$$

Example 2 Phases Present in Formed Ca—SiAlON Ceramics

Figure 1D:
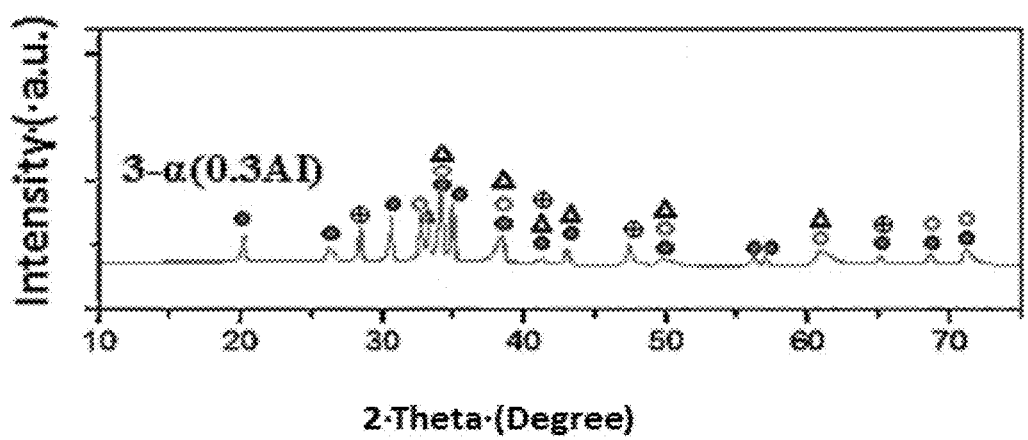
FIG. 1D shows the XRD pattern of sample 3-α(0.3Al) (with 30 mol % of aluminum nitride substituted with aluminum and sintered at 1600° C.), which comprises α-SiAlON (●), $SiAl_5O_2N_5$ (○), $SiAl_6O_2N_6$ (Δ) and $SiO_2$ (⊕).

FIG. 1 shows the XRD patterns of samples 3-α (FIG. 1A), 3-α(0.1Al) (FIG. 1B), 3-α(0.2Al) (FIG. 1C) and 3-α(0.3Al) (FIG. 1D). There was a large quantity of β-SiAlON in sample 3-α. However, as more aluminum metal was incorporated in the starting mixture, the amount of α-SiAlON increased, and the proportion of α-SiAlON was the largest in sample 3-α(0.3Al). Different aluminum silicon oxynitride phases were observed in different proportions across the samples. The more aluminum metal is added to the ceramic, the higher the nitrogen to oxygen ratio of the aluminum silicon oxynitride phase. For instance, in the Si$_{3.1}$Al$_{2.9}$O$_{2.9}$N$_{5.1}$ phase in sample 3-α, has a N:O ratio of 5:3. In sample 3-α(0.1Al), the N:O ratio increased to 5:2 due to the presence of SiAl$_5$O$_2$N$_5$ phase. Further, an additional increase arose from the presence of SiAl$_6$O$_2$N$_6$ phase in samples 3-α(0.2Al) and 3-α(0.3Al). A small amount of SiO$_2$ was detected in samples 3-α(0.2Al) and 3-α(0.3Al), with a slightly higher concentration in the latter.

Figure 2A:
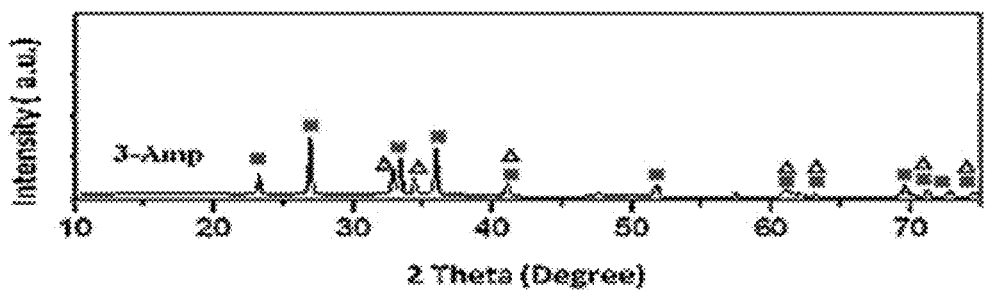
FIG. 2A shows the XRD pattern of sample 3-Amp (sintered at 1600° C.), which comprises β-SiAlON (■) and $SiAl_6O_2N_6$ (Δ).
Figure 2B:
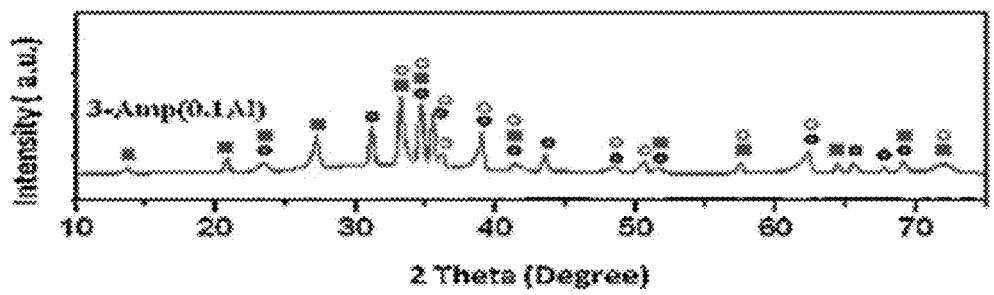
FIG. 2B shows the XRD pattern of sample 3-Amp(0.1Al) (with 10 mol % of aluminum nitride substituted with aluminum and sintered at 1600° C.), which comprises β-SiAlON (■) and $SiAl_6O_2N_6$ (Δ).
Figure 2C:
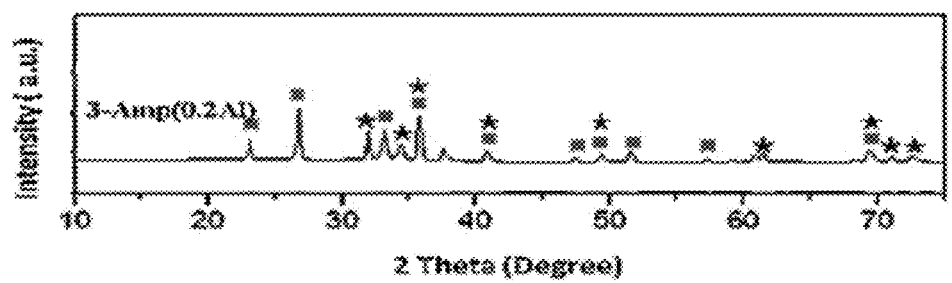
FIG. 2C shows the XRD pattern of sample 3-Amp(0.2Al) (with 20 mol % of aluminum nitride substituted with aluminum and sintered at 1600° C.), which comprises β-SiAlON (■) and $SiAl_4O_2N_4$ (+).
Figure 2D:
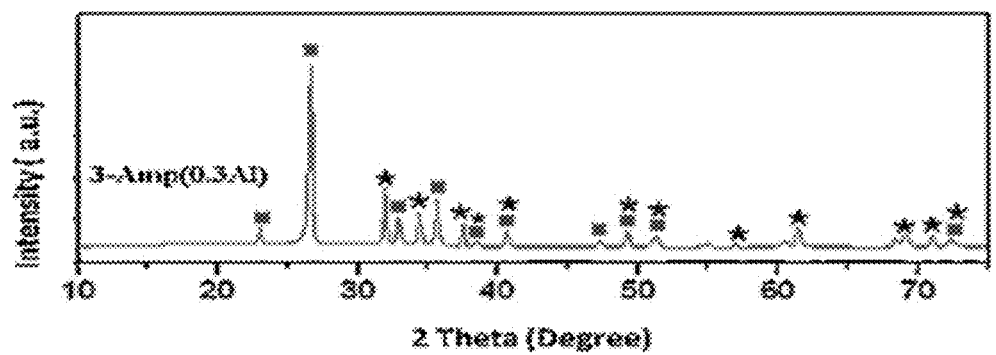
FIG. 2D shows the XRD pattern of sample 3-Amp(0.3Al) (with 30 mol % of aluminum nitride substituted with aluminum and sintered at 1600° C.), which comprises β-SiAlON (■) and $SiAl_4O_2N_4$ (★).

FIG. 2 presents the XRD patterns of samples 3-Amp (FIG. 2A), 3-Amp(0.1Al) (FIG. 2B), 3-Amp(0.2Al) (FIG. 2C) and 3-Amp(0.3Al) (FIG. 2D). The distinct feature observed in these samples was the presence of β-SiAlON, which increased as the amount of aluminum amount increased. On the contrary, α-SiAlON was present in relatively small amounts in sample 3-Amp(0.1Al). Various aluminosilicates oxynitride phases were present in all amorphous samples. Contrary to what was observed in 3-α sample series, the N:O ratio decreased as more aluminum was incorporated.

Example 3 Microstructure of Formed Ca—SiAlON Ceramics

Figure 3:
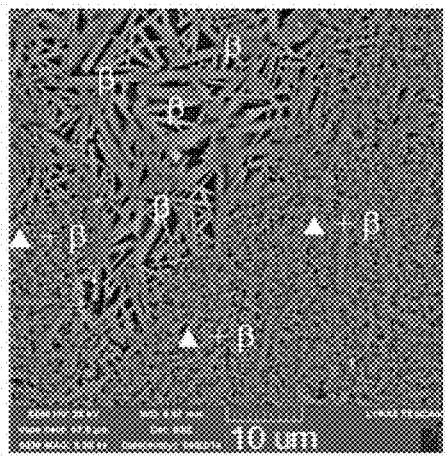
FIG. 3 is a SEM micrograph of sample 3-α (sintered at 1600° C.), which comprises β-SiAlON (β) and $Si_{3.1}Al_{2.9}O_{2.9}N_5$ (▲).
Figure 4:
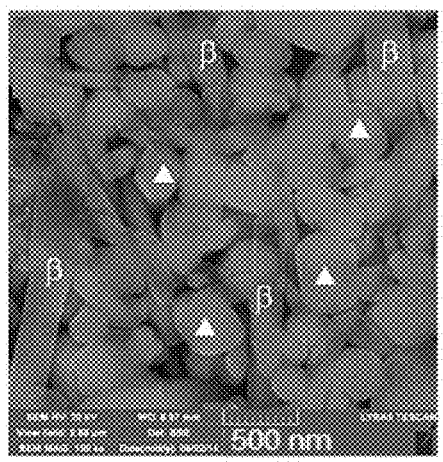
FIG. 4 is a SEM micrograph of sample 3-α (sintered at 1600° C.), which comprises β-SiAlON (β) and $Si_{3.1}Al_{2.9}O_{2.9}N_5$ (▲).

FESEM micrographs of samples 3-α, 3-α(0.1Al), 3-α(0.2Al) and 3-α(0.3Al) are shown in FIGS. 3-7. The grains in sample 3-α have two types of morphology: plate-like and semi-equiaxed structures. XRD analysis showed that this sample consisted of β-SiAlON and Si$_{3.1}$Al$_{2.9}$O$_{2.9}$N$_{5.1}$ phases. It is known that β-SiAlON exhibits an elongated morphology, which is apparent in the FESEM image (FIG. 3). The second phase Si$_{3.1}$Al$_{2.9}$O$_{2.9}$N$_{5.1}$ exhibits semi-equiaxed grains structure, which was located within β-SiAlON plates (FIG. 4). As aluminum metal was incorporated in the reaction, the amount of α-SiAlON phase increased in samples 3-α(0.1Al), 3-α(0.2Al) and 3-α(0.3Al), whereas the β-SiAlON phase disappeared in these samples, leaving several aluminosilicates oxynitride phases.

Figure 5:
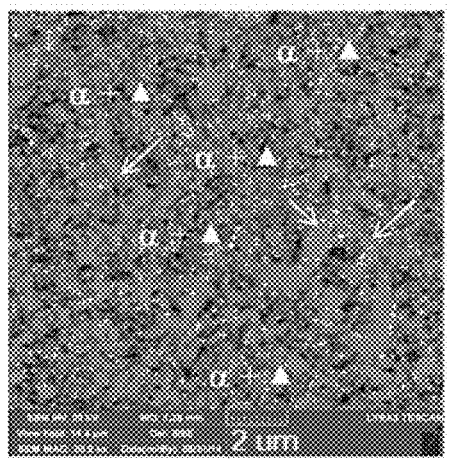
FIG. 5 is a SEM micrograph of sample 3-α(0.1Al) (with 10 mol % of aluminum nitride substituted with aluminum and sintered at 1600° C.), which comprises α-SiAlON (α), $Si_{3.1}Al_{2.9}O_{2.9}N_{5.1}$ (▲) and $SiAl_5O_2N_5$ (→).
Figure 6:
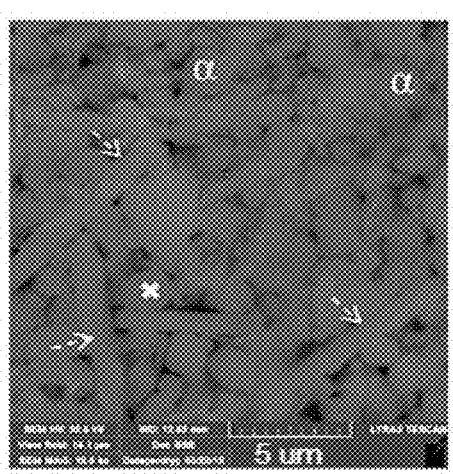
FIG. 6 is a SEM micrograph of sample 3-α(0.2Al) (with 20 mol % of aluminum nitride substituted with aluminum and sintered at 1600° C.), which comprises α-SiAlON (α), $SiAl_6O_2N_6$ (→) and $SiO_2$ (×).
Figure 7:
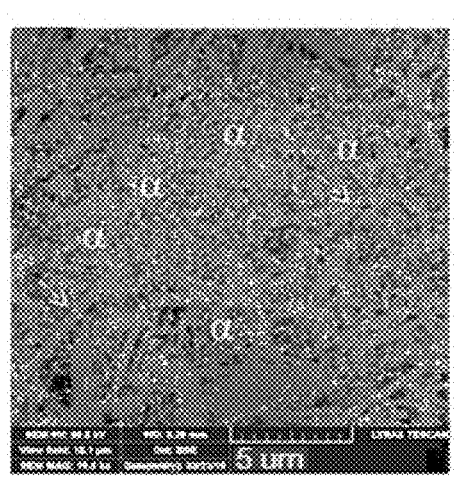
FIG. 7 is a SEM micrograph of sample 3-α(0.3Al) (with 30 mol % of aluminum nitride substituted with aluminum and sintered at 1600° C.), which comprises α-SiAlON (α) and $SiAl_6O_2N_6$ (→).

FIGS. 5 and 6 reveal that the aspect ratio of SiAl$_5$O$_2$N$_5$ phase is smaller than that of SiAl$_6$O$_2$N$_6$ phase. Comparing these figures with FIG. 3, which corresponds to sample 3-α, the micrographs indicated that the level of phase dispersion was enhanced as the amount of aluminum metal increased.

Figure 8:
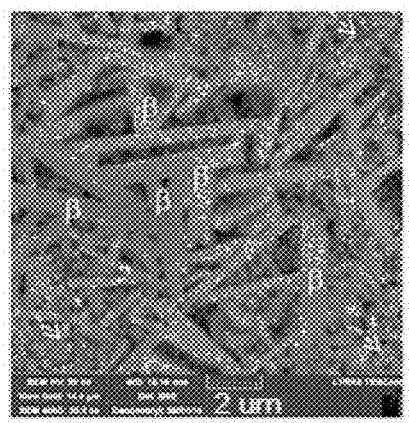
FIG. 8 is a SEM micrograph of sample 3-Amp (sintered at 1600° C.), which comprises β-SiAlON (β) and $SiAl_6O_2N_6$ (→).
Figure 9:
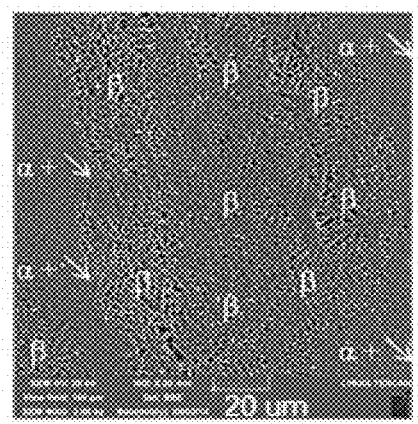
FIG. 9 is a SEM micrograph of sample 3-Amp(0.1Al) (with 10 mol % of aluminum nitride substituted with aluminum and sintered at 1600° C.), which comprises α-SiAlON (α), β-SiAlON (β) and $SiAl_5O_2N_5$ (→).
Figure 10:
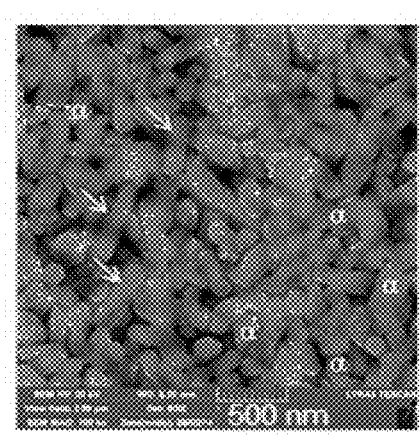
FIG. 10 is a SEM micrograph of sample 3-Amp(0.1Al) (with 10 mol % of aluminum nitride substituted with aluminum and sintered at 1600° C.), which comprises α-SiAlON (α) and $SiAl_5O_2N_5$ (→).
Figure 11:
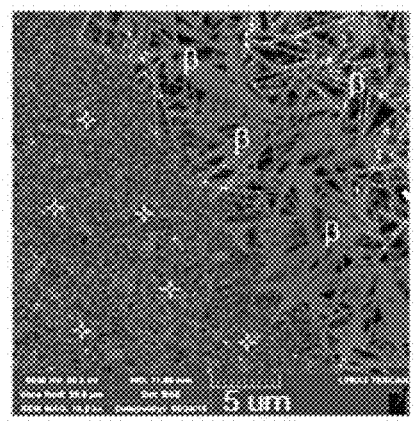
FIG. 11 is a SEM micrograph of sample 3-Amp(0.2Al) (with 20 mol % of aluminum nitride substituted with aluminum and sintered at 1600° C.), which comprises β-SiAlON (β) and $SiAl_4O_2N_4$ (+).
Figure 12:
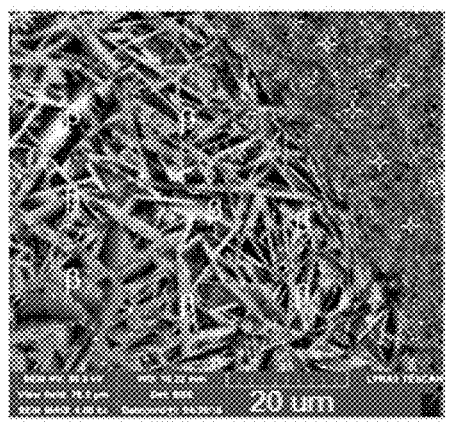
FIG. 12 is a SEM micrograph of sample 3-Amp(0.3Al) (with 30 mol % of aluminum nitride substituted with aluminum and sintered at 1600° C.), which comprises β-SiAlON (β) and $SiAl_4O_2N_4$ (+).

FESEM micrographs of 3-Amp sample series are shown in FIG. 8. The unique feature appearing in all samples is the dominance of β-SiAlON as a major phase, and sample 3-Amp(0.3Al) had the most β-SiAlON. α-SiAlON formed surprisingly in sample 3-Amp(0.1Al) (FIGS. 9 and 10). In addition to these phases, different aluminosilicates oxynitride phases were present. It is prominent that β-SiAlON formed at the expense of these phases, as demonstrated by samples 3-Amp(0.2Al) (FIG. 11), and 3-Amp(0.3Al) (FIG. 12), in which the amount of SiAl$_4$O$_2$N$_4$ was reduced in sample 3-Amp(0.3Al) compared with sample 3-Amp (0.2Al). The observation was also confirmed by XRD results (FIG. 2).

Example 4 Effect of Adding Aluminum on Mechanical Properties of Formed Ca—SiAlON Ceramics Table 3 shows that replacing a portion of aluminum nitride by aluminum led to the enhancement of mechanical properties of the sintered samples. An increase of 27% in Vickers hardness and 13% in fracture toughness were achieved through 30% aluminum nitride substitution with aluminum. An enhancement of about 24% in fracture toughness was achieved by 20% aluminum nitride substitution with aluminum, i.e. sample 3-α(0.2Al). However, the hardness value decreased compared to sample 3-α (0.3Al). Aluminum may form aluminum nitride during the sintering under an atmosphere of nitrogen gas. Nitridation of aluminum usually takes place at low temperatures, say around 530° C. and lower, but for prolonged duration, being different for different techniques and processing conditions (Visuttipitukul, Patama, Tatsuhiko Aizawa, and Hideyuki Kuwahara. Materials Transactions 44.12 (2003): 2695-2700, incorporated herein by reference in its entirety).

TABLE 3

Experimental results of the samples sintered at 1600° C.

| Sample | Density (g/cm$^3$) | HV$_{10}$ (GPa) | K$_{IC}$ (MPa√m) |
|---|---|---|---|
| 3-α | 3.11 | 13.4 ± 0.7 | 7.2 ± 2.4 |
| 3-α(0.1Al) | 3.15 | 13.7 ± 0.6 | 6.4 ± 1.5 |
| 3-α(0.2Al) | 3.10 | 16 ± 0.5 | 9.5 ± 1.9 |
| 3-α(0.3Al) | 3.15 | 18.5 ± 0.7 | 8.3 ± 0.7 |
| 3-Amp | 3.11 | 12.3 ± 0.8 | 5.2 ± 1.3 |
| 3-Amp(0.1Al) | 3.09 | 12.2 ± 0.3 | 6.1 ± 1.5 |
| 3-Amp(0.2Al) | 3.10 | 13.3 ± 0.4 | 5.3 ± 1.0 |
| 3-Amp(0.3Al) | 3.09 | 14.4 ± 1.0 | — |

The presence of α-SiAlON is definitely responsible for the enhancement in the hardness values, as well as the increased fracture toughness due to the crack deflection mechanism that is supported by the mixed-morphology microstructure.

One possible mechanism for the increase in hardness could be that a higher temperature is required for the α→β transformation (Mandal, Hasan. Journal of the European Ceramic Society 19.13 (1999): 2349-2357, incorporated herein by reference in its entirety). Another possible mechanism would be the reverse transformation from β-SiAlON to α-SiAlON is favored under the aforementioned compositions of powder mixtures and sintering conditions.

Example 5 Formation of Elongated α-SiAlON Grains

Figure 13:
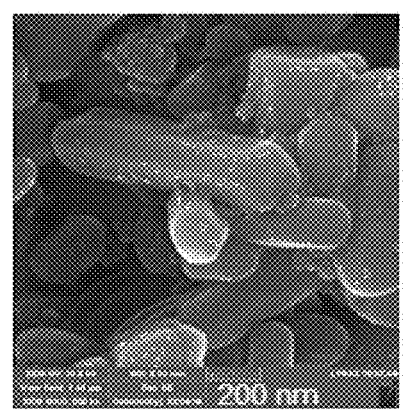
FIG. 13 is a SEM micrograph showing the elongated α-SiAlON grains in sample 3-α(0.3Al) (with 30 mol % of aluminum nitride substituted with aluminum and sintered at 1600° C.).
Figure 14:
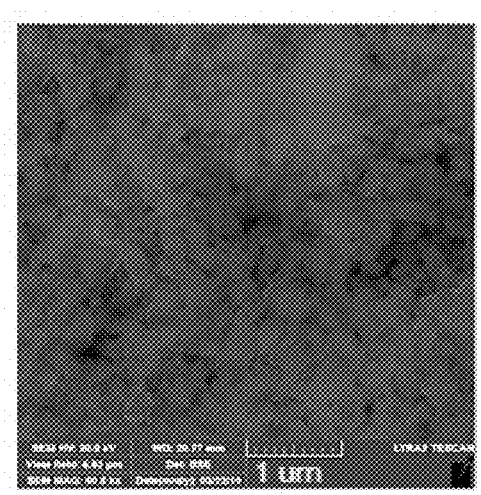
FIG. 14 is a SEM micrograph of sample 3-α (sintered at 1450° C.).
Figure 15:
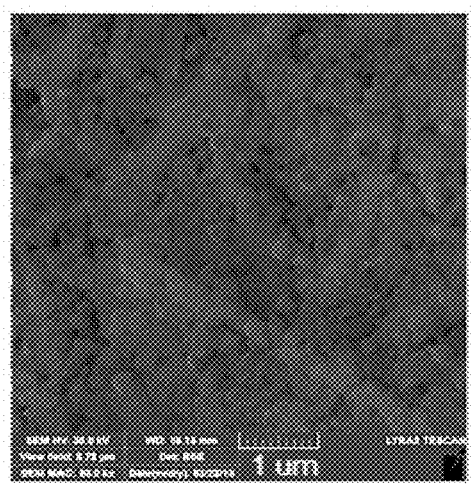
FIG. 15 is a SEM micrograph of sample 3-α(0.1Al) (with 10 mol % of aluminum nitride substituted with aluminum and sintered at 1450° C.).
Figure 16:
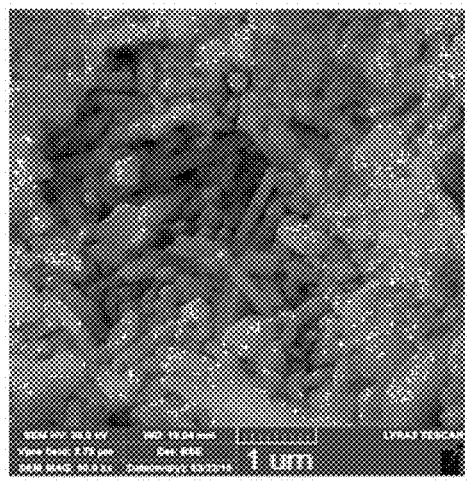
FIG. 16 is a SEM micrograph of sample 3-α(0.2Al) (with 20 mol % of aluminum nitride substituted with aluminum and sintered at 1450° C.).
Figure 17:
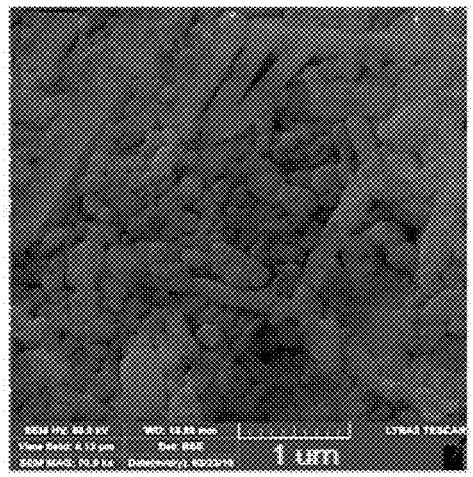
FIG. 17 is a SEM micrograph of sample 3-α(0.3Al) (with 30 mol % of aluminum nitride substituted with aluminum and sintered at 1450° C.).

It is interesting to note the formation of elongated α-SiAlON grains in sample 3-α(0.3Al) (FIG. 13). Kurama and his group have reported that elongated α-SiAlON grains may be formed if α-SiAlON formation is hindered at low temperatures by using fast heating rates during sintering (Kurama, S., M. Herrmann, and H. Mandal. Journal of the European Ceramic Society 22.1 (2002): 109-119, incorporated herein by reference in its entirety). Spark plasma sintering provides a fast heating rate, however, it should be noted that spark plasma sintered samples prepared by other research groups do not form elongated α-SiAlON grains. Kurama has shown the necessity of having enough glassy phase to aid the elongation process that is thought to be more diffusion controlled from one side of the grain than the other (Li, Ya-Wen, et al. Materials Letters 47.4 (2001): 281-285, incorporated herein by reference in its entirety).

The presence of additional amount of the liquid phase is known to occur at high m and n values. Thus, it seems reasonable to assume that part of aluminum formed extra liquid phase during the initial stages of sintering.

Example 6 Role of Aluminum in Improving Sintering of Ca—SiAlON Ceramics

The 3-α series samples were sintered at a lower temperature, 1450° C., for the same holding time (30 min). The corresponding micrographs are displayed in FIGS. 14-17 and the associated hardness and fracture toughness values are listed in Table 4. It is apparent from these data that the presence of aluminum metal improved the sintering of Ca—SiAlON ceramics. The samples could be sintered at a lower temperature with minimal effects on their mechanical properties. To verify this, one may compare sample 3-α sintered at 1600° C. and 3-α(0.3 Al) sintered at 1450° C. (Table 4). The Vickers hardness increased from 13.4 GPa for sample 3-α to 19.6 GPa for 3-α(0.3 Al), while the fracture toughness decreased from 7.2 MPa√m for sample 3-α to 6.6 MPa√m for 3-α(0.3 Al). However, by comparing the sample 3-α sintered at both temperatures, one would recognize a worse reduction in fracture toughness. Thus, adding aluminum metal precursor resulted in minimal negative effects on the mechanical properties of Ca—SiAlON ceramics sintered at lower temperatures.

TABLE 4

Summary of experimental results of the samples sintered at 1450° C.

| Sample | Density (g/cm$^3$) | HV$_{10}$ (GPa) | K$_{IC}$ (MPa√m) | Phases |
|---|---|---|---|---|
| 3-α | 3.17 | 17.0 ± 0.3 | 4.4 ± 0.8 | α-SiAlON (S), SiAl$_6$O$_2$N$_6$ (W), SiO$_2$ (W) |
| 3-α(0.1Al) | 3.16 | 18.6 ± 0.4 | 7.8 ± 0.8 | α-SiAlON (VS), SiAl$_5$O$_2$N$_5$ (W) |
| 3-α(0.2Al) | 3.16 | 19.1 ± 0.2 | 6.4 ± 0.4 | α-SiAlON (S), SiAl$_5$O$_2$N$_5$ (M), |
| 3-α(0.3Al) | 3.15 | 19.6 ± 0.3 | 6.5 ± 0.8 | α-SiAlON (M), SiAl$_5$O$_2$N$_5$ (M), SiO$_2$ (W) |

VS: very strong, S: strong, M: medium, W: weak, VW: very weak

As a tentative rule, the aluminum amount is to be increased as the sintering temperature is raised up, to form α-SiAlON as a major phase.

Example 7 Effect of Aluminum Precursor on Amorphous Samples

In contrary to the positive role played by the aluminum precursor in the 3-α series samples, the enhancement in mechanical properties of amorphous samples was limited. The Vickers hardness started to increase with 20% aluminum replacement, giving a maximum of 14.4 GPa for sample 3-Amp(0.3Al). The presence of α-SiAlON in sample 3-Amp(0.1Al) did not lead to an increased hardness of the sample because α-SiAlON was present in a small amount, as revealed by XRD and SEM results. The presence of aluminosilicates oxynitride phases might decrease the hardness. Therefore, when 13-SiAlON phase grew at the expense of these phases, the hardness value was raised from 12.3 GPa to 14.4 GPa. The fracture toughness values did not vary much because aluminosilicates oxynitride phases and β-SiAlON possess the same grain morphology but the respective grains have different aspect ratios, as demonstrated by FESEM and XRD results. The formation of β-SiAlON in these samples was expected because amorphous Si$_3$N$_4$ would transform directly to β-SiAlON, which is the most stable phase of SiAlON.

The invention claimed is:
1. A process for producing a Ca—SiAlON ceramic, comprising:
  mixing
    calcium oxide;
    silicon nitride;
    alumina;
    aluminum nitride; and
    aluminum to form a powder mixture;

sintering the powder mixture to form the Ca—SiAlON ceramic; and cooling the Ca—SiAlON ceramic to a temperature ranging from 20-40° C.

2. The process of claim 1, wherein the sintering is performed in an atmosphere consisting essentially of nitrogen gas.

3. The process of claim 1, wherein the mixing is at least one of sonication and ball milling.

4. The process of claim 1, wherein the mixing proceeds for 10-30 minutes.

5. The process of claim 1, wherein the calcium oxide is in the form of particles with a diameter ranging from 1-200 nm.

6. The process of claim 1, wherein an amount of the silicon nitride ranges from 40 wt % to less than 80 wt % relative to a total weight of the powder mixture.

7. The process of claim 1, wherein the silicon nitride is α-$Si_3N_4$ and in the form of particles with a diameter ranging from 1-200 nm.

8. The process of claim 1, wherein the silicon nitride is amorphous and in the form of particles with a diameter ranging from 1-100 nm.

9. The process of claim 1, wherein the alumina is in the form of particles with a diameter ranging from 1-200 nm.

10. The process of claim 1, wherein the aluminum nitride is in the form of particles with a diameter ranging from 1-200 nm.

11. The process of claim 1, wherein the aluminum is in the form of particles with a diameter ranging from 10-100 μm.

12. The process of claim 1, wherein an amount of the aluminum ranges from more than 0 wt % to 10 wt % relative to a total weight of the powder mixture.

13. The process of claim 1, wherein the sintering is a spark plasma sintering process.

14. The process of claim 1, wherein the sintering is performed at a temperature ranging from 1400-1600° C.

15. The process of claim 1, wherein the sintering comprises heating the powder mixture at a rate ranging from 5-600° C./min.

16. The process of claim 1, wherein the sintering comprises heating the powder mixture at a rate ranging from 90-110° C./min.

17. The process of claim 1, wherein the sintering comprises applying a uniaxial pressure ranging from 20-150 MPa to the powder mixture.

18. The process of claim 1, wherein the sintering comprises applying a uniaxial pressure ranging from 45-55 MPa to the powder mixture.

* * * * *